United States Patent
Hasegawa

(10) Patent No.: US 6,459,849 B1
(45) Date of Patent: *Oct. 1, 2002

(54) REPRODUCING APPARATUS FOR REPRODUCING A VIDEO SIGNAL INCLUDING A PLURALITY OF SMALL IMAGES

(75) Inventor: Masahide Hasegawa, Kanagawa-ken (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/671,117

(22) Filed: Jun. 24, 1996

Related U.S. Application Data

(63) Continuation of application No. 09/497,139, filed on Jun. 30, 1995, now abandoned, which is a continuation of application No. 08/254,481, filed on Jun. 6, 1994, now abandoned, which is a continuation of application No. 08/004,226, filed on Jan. 11, 1993, now abandoned, which is a continuation of application No. 07/360,380, filed on Jun. 2, 1989, now abandoned, which is a continuation of application No. 07/177,505, filed on Apr. 4, 1988, now Pat. No. 4,890,165.

(30) Foreign Application Priority Data

| Apr. 6, 1987 | (JP) | 62-084105 |
| Apr. 6, 1987 | (JP) | 62-084107 |
| Apr. 6, 1987 | (JP) | 62-084108 |
| Jun. 10, 1987 | (JP) | 62-144724 |

(51) Int. Cl.$^7$ .......................... H04N 5/76; H04N 5/225
(52) U.S. Cl. ................. 386/109; 386/117; 358/906
(58) Field of Search .............................. 360/9.1, 18, 23, 360/24, 33.1, 14.1, 35.1, 38.1; 358/310, 313, 335, 339, 336, 906, 909.1; 386/1, 38, 45, 95, 107, 33, 117, 121, 125–126; H04N 5/76, 5/78, 5/92, 9/79, 5/94, 5/95, 5/225

(56) References Cited

U.S. PATENT DOCUMENTS

| 3,837,003 A | * | 9/1974 | Justice ...................... 360/18 X |
| 3,849,776 A | * | 11/1974 | Swynford-Lain ......... 360/18 X |
| 4,542,417 A | * | 9/1985 | Ohta .......................... 386/109 |
| 4,612,569 A | * | 9/1986 | Ichinose ................ 360/14.1 X |
| 4,675,754 A | * | 6/1987 | Endo et al. ............ 360/38.1 X |
| 4,772,962 A | * | 9/1988 | Tanaka et al. ............. 360/35.1 |
| 4,775,898 A | * | 10/1988 | Akabane et al. ....... 360/35.1 X |
| 4,785,358 A | * | 11/1988 | Ninomiya ................... 360/9.1 |
| 4,788,589 A | * | 11/1988 | Kondo ........................ 386/110 |
| 4,796,123 A | * | 1/1989 | Takeuchi et al. ......... 358/339 X |
| 4,802,025 A | * | 1/1989 | Shinada ...................... 358/339 |
| 4,825,379 A | * | 4/1989 | Luthra et al. ........... 358/339 X |
| 4,835,623 A | * | 5/1989 | Okano et al. ............... 358/339 |
| 4,843,485 A | * | 6/1989 | Reitmeier .................... 360/9.1 |
| 4,860,122 A | * | 8/1989 | Kanamaru ............. 360/35.1 X |
| 4,882,633 A | * | 11/1989 | Nakatani et al. ............ 358/339 |
| 4,890,165 A | * | 12/1989 | Hasegawa ................... 358/310 |
| 5,166,840 A | * | 11/1992 | Nemoto et al. ............. 358/906 |
| 5,754,727 A | * | 5/1998 | Nagasawa et al. ............ 386/33 |

* cited by examiner

Primary Examiner—Thai Tran
(74) Attorney, Agent, or Firm—Robin, Blecker & Daley

(57) ABSTRACT

A video signal reproducing apparatus for reproducing a video signal from a recording medium on which the video signal is recorded, the video signal including a plurality of small images in each of vertical scanning periods, comprises: a reproducer for reproducing the video signal recorded on the recording medium; a memory capable of storing a portion of one vertical scanning period of the video signal reproduced by the reproducer; and a memory controller for controlling writing and reading operations of the memory so that a video signal read out from the memory contains only one of the small images in each of vertical scanning periods.

10 Claims, 15 Drawing Sheets

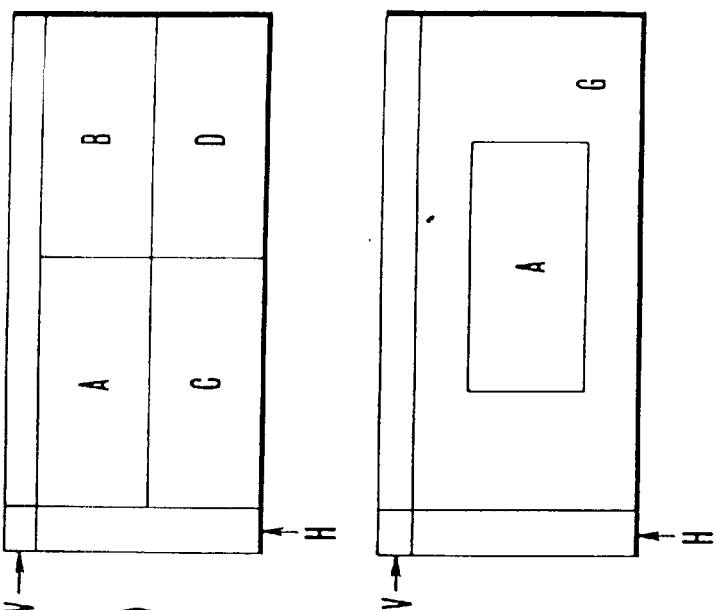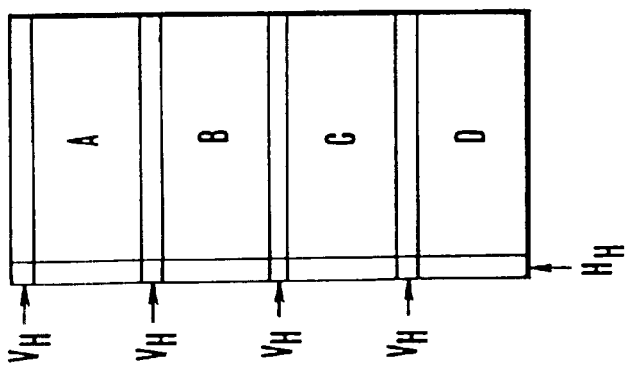
FIG.11(a)
FIG.11(b)
FIG.11(c)

FIG.16(a)
FIG.16(b)
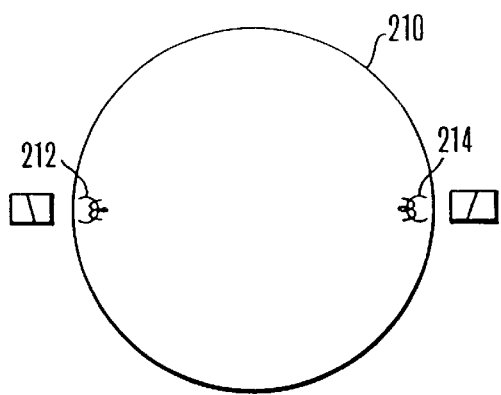
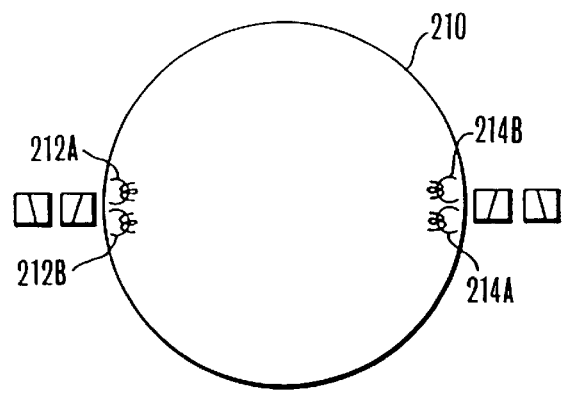

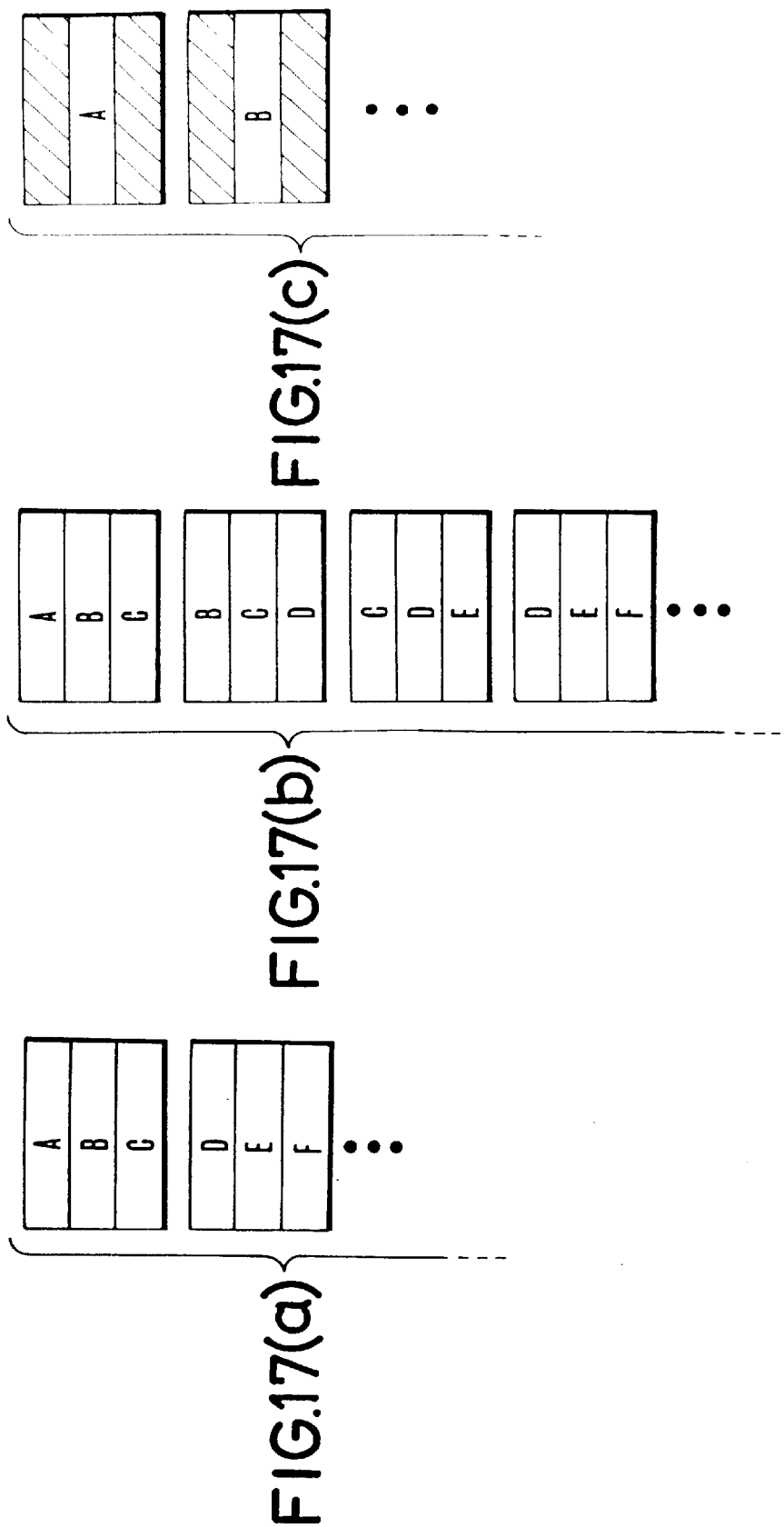

REPRODUCING APPARATUS FOR REPRODUCING A VIDEO SIGNAL INCLUDING A PLURALITY OF SMALL IMAGES

This is a continuation application under 37 CFR 1.62 of prior application Ser. No. 08/497,139 filed on Jun. 30, 1995, now abandoned which is a continuation of application Ser. No. 08/254,481, filed Jun. 6, 1994, now abandoned which is a continuation of application Ser. No. 08/004,226, filed Jan. 11, 1993, now abandoned which is a continuation of Ser. No. 07/360,380, filed Jun. 2, 1989 (now abandoned), which is a continuation of Ser. No. 07/177,505, filed Apr. 4, 1988 now U.S. Pat. No. 4,890,165.

BACKGROUND OF THE INVENTION

1. Field of the Invention

This invention relates to a high speed image pick-up apparatus arranged to be capable of producing a video signal having a high degree of information density in the direction of the time base of the signal.

2. Description of the Related Art

For the high speed image sensing system of a video camera, it has been known to raise both a vertical scanning frequency fVS and a horizontal scanning frequency fHS at the same rate. However, a method of simply raising these scanning frequencies fVS and fHS necessitates an increase in the frequency band of the signal processing circuit of the camera as the signal frequency likewise becomes higher. Further, in cases where a video signal produced from the camera is to be recorded, such a simple method also necessitates the use of a recording device which has a wide frequency band and is, therefore, very expensive. In the case of a TV signal of the NTSC system, for example, the video signal frequency band is approximately from 0 to 4 MHz. If the processing speed for this signal is to be increased by five times, the camera and the recording device must be arranged to be capable of processing a signal of a frequency band from 0 to 20 MHz.

In accordance with a conceivable method for permitting a recording operation within a lower signal frequency band, the video signal may be divided into a plurality of recording channels. However, the dividing method results in a complex recording signal processing arrangement. Besides, reproduction of the signal recorded in such a manner also requires a complex signal processing arrangement. Therefore, it necessitates use of expensive recording and reproducing systems.

Further, with the signal frequency increased as a whole, in cases where the video signal output of the system is to be displayed by a monitor device, the monitor inevitably becomes expensive as it must be arranged to be capable of operating at a higher speed in response to the increased signal frequency.

Meanwhile, in the field of the home video cameras, video cameras having a high shutter speed of 1/1000 or 1/2000 sec or thereabout have been commercialized. As a result of this, there has arisen a public desire for a video camera and a video recording and/or reproducing system which are capable of producing a video signal having high information density in the direction of time base and yet are inexpensive.

SUMMARY OF THE INVENTION

In view of the background described in the foregoing, it is an object of this invention to provide an inexpensive image pick-up apparatus which is capable of performing an image sensing operation at a high speed.

It is another object of the invention to provide a high speed image sensing system which permits use of inexpensive recording/reproducing apparatuses.

Under the above stated object, an image pick-up apparatus which is arranged according to this invention comprises: image sensing means for converting an image of an object formed on an image sensing plane into an electrical video signal; synchronizing signal adding means for adding horizontal and vertical synchronizing signals to the video signal produced from the image sensing means; periodic signal generating means for generating a periodic signal of a frequency which is an n number (n: an integer which is at least 2) times as high as the frequency of the vertical synchronizing signal; and scanning signal generating means for generating and supplying to the image sensing means a vertical scanning signal to cause a vertical scanning process to be performed on the image sensing plane in a cycle which is 1/n of the period of the vertical synchronizing signal on the basis of the periodic signal.

The above and other objects and features of the invention will become apparent from the following detailed description of embodiments thereof taken in connection with the accompanying drawings.

BRIEF DESCRIPTION OF THE DRAWINGS

FIGS. 11(a), 11(b) and 11(c) schematically show a video signal as obtained at various parts of the apparatus of FIG. 8.

FIGS. 16(a) and 16(b) show the head arrangement of the reproducing apparatus of FIG. 15.

FIGS. 17(a), 17(b) and 17(c) schematically show a video signal as obtained at the various parts of the apparatus of FIG. 15.

DETAILED DESCRIPTION OF THE PREFERRED EMBODIMENTS

Figure 1:
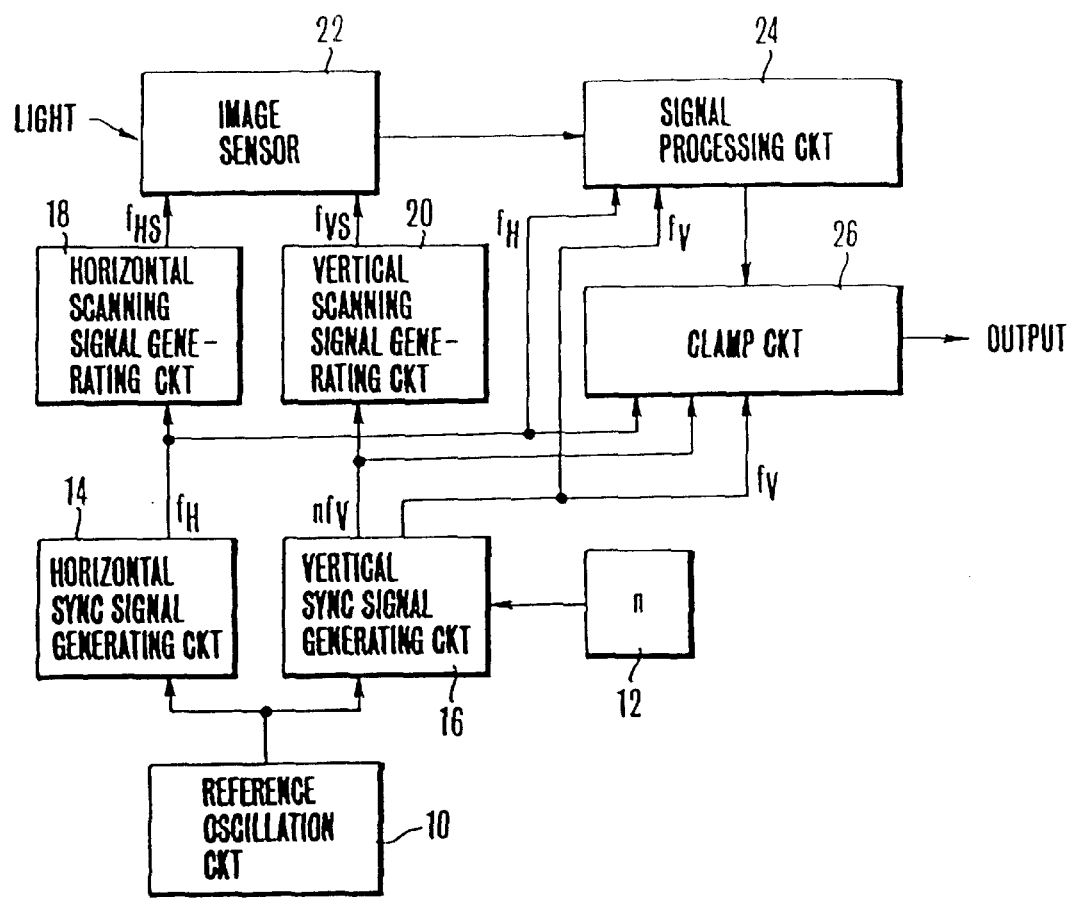
FIG. 1 is a block diagram showing an image pick-up apparatus arranged according to this invention as an embodiment thereof.

Embodiments of this invention are described below with reference to the accompanying drawings, in which FIG. 1 shows in a block diagram an image pick-up apparatus arranged according to this invention:

Referring to FIG. 1, the illustration includes a reference oscillation circuit 10; and a speed signal generating circuit 12 which is arranged to generate a speed signal designating a speed increasing rate n for a high speed photo taking operation. The rate n is an integer. When the rate n is set at 1, the apparatus performs a photo taking operation at a normal speed. For a high speed photo taking operation, the rate n is set at a value larger than 1. A horizontal sync (synchronizing) signal generating circuit 14 is arranged to form a horizontal sync signal fH on the basis of a reference signal obtained. from the reference oscillation circuit 10. A vertical sync signal generating circuit 16 is arranged to form, on the basis of the reference signal from the reference oscillation circuit 10 and the speed signal from the speed signal generating circuit 12, a normal vertical sync signal fV having a normal vertical sync signal frequency and a vertical sync signal nfV having a frequency which is n times as high as the normal vertical sync signal frequency. A horizontal scanning signal generating circuit 18 is arranged to generate a horizontal scanning signal fHS in synchronism with the horizontal sync signal fH. A vertical scanning signal generating circuit 20 is arranged to generate a vertical scanning signal fVS in synchronism with the normal photo taking vertical sync signal fV or the high speed photo taking vertical sync signal nfV.

Figure 2:
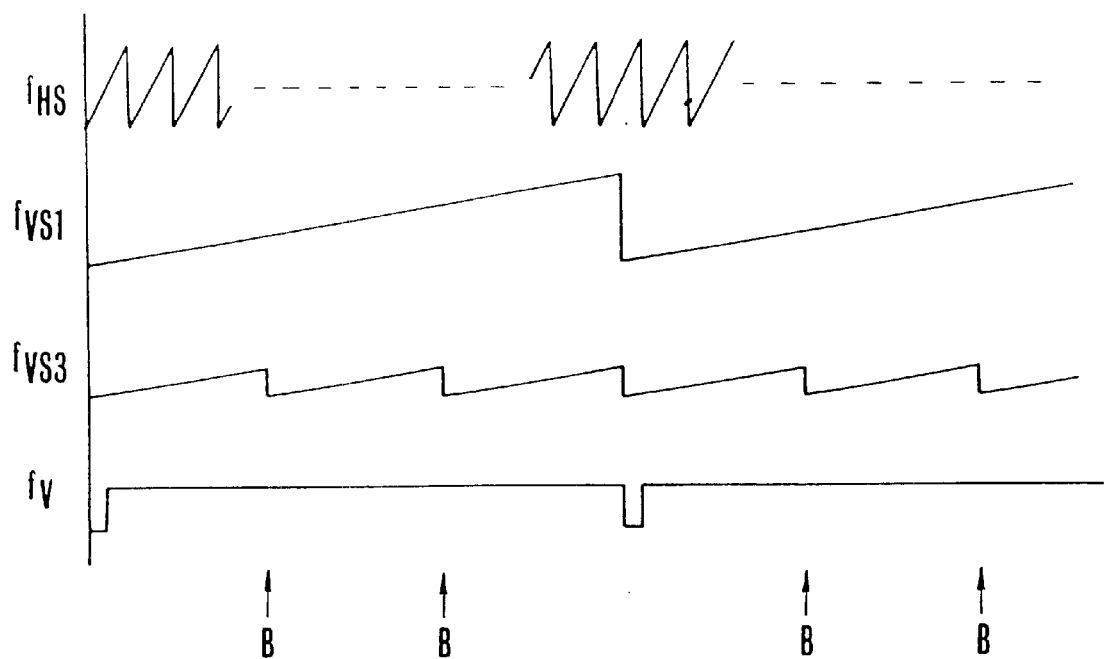
FIG. 2 is a timing chart showing signals produced from various parts of FIG. 1.

An image sensor 22 is arranged to convert into an electrical signal a photo signal of each of picture elements of an image plane in accordance with the horizontal scanning signal fHS and the vertical scanning signal fVS. The image sensor 22 is either a known camera tube such as a vidicon or a known solid-state image sensor of the type called CCD or MOS. In case that the image sensor 22 is a camera tube, the horizontal scanning signal fHS from the horizontal scanning signal generating circuit 18 has its wave form voltage change in a saw-tooth like manner in synchronism with the horizontal sync signal fH. Then, the vertical scanning signal fVS has its wave form voltage change in a saw-tooth like manner in synchronism with either the vertical sync signal fV for normal photo taking or the vertical sync signal nfV for high speed photo taking. In the case of the camera tube, the timing relation of the horizontal and vertical scanning signals fHS and fVS to the vertical sync signal fV is as shown in FIG. 2. In FIG. 2, a reference symbol fVS3 denotes a vertical scanning signal produced in the event of a triple high speed while a symbol fVS1 denotes a vertical scanning signal produced for the normal photo taking speed. The amplitude of the signal fVS3 is ⅓ of the signal fVS1.

A signal processing circuit 24 is arranged to perform a known signal processing operation such as a shading correction, color processing, etc. on a video signal produced from the image sensor 22. The output of the circuit 24 is supplied to a clamp circuit 26. The clamp circuit 26 is arranged to add the horizontal and vertical sync signals fH and fV to the video signal processed by the signal processing circuit 24. When the video signal obtained by the image pick-up apparatus of this embodiment is supplied to a TV monitor device for monitoring, an image thus obtained on a reproduced picture plane includes, for example in the triple high speed, three two-dimensional small images which are temporally continuous in the vertical direction. To clearly separate these small images from each other, the clamp circuit 26 is preferably arranged to insert a signal of a fixed amplitude such as a black burst or a 100% white signal or the like over a horizontal synchronizing period at a timing as indicated by a symbol B in FIG. 2 in accordance with the vertical sync signal nfV. This arrangement not only effectively removes a noise otherwise produced at the vertical fly-back (or retrace line) part in scanning the monitor picture plane but also adds a frame to the picture plane to make the reproduced image more easily observable.

Figure 3A:
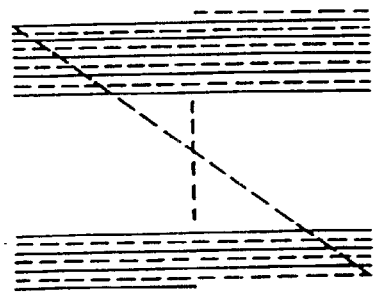
FIGS. 3(a) and 3(b) show the scanning operation on the image sensing plane of the apparatus of FIG. 1.
Figure 3B:
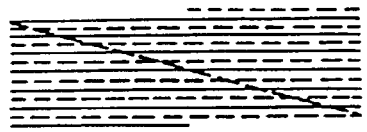

FIGS. 3(a) and 3(b) show a comparison between a normal speed photo taking operation and a triple high speed photo taking operation with interlaced scanning performed on the image sensing plane of the image sensor 22. In these drawings, FIG. 3(a) shows the normal speed photo taking operation and FIG. 3(b) the triple high speed photo taking operation. Since the interlaced scanning is performed at a rate of 262.5 H/field in the case of NTSC system, the rate obtained in the triple high speed photo taking mode is 87.5 H/field. Conditions required for interlaced scanning sometimes cannot be satisfied depending on the photo taking speed or the type of the signal. In that event, the problem can be solved by synchronizing pulses of a timing (the timing B of FIG. 2) which corresponds to the vertical sync signal nfV with the horizontal sync signal fH in such a way as to meet the interlacing conditions.

In the case of high speed photo taking, as understood from FIGS. 3(a) and 3(b), some part of the image sensing plane of the image sensor 22 is left vertically unscanned. Meanwhile, the light is incident also on the unscanned part. Therefore, electric charge might bleed from the unscanned part to impair the signal during several horizontal scanning periods at the end part of the scanning area. Such impaired signal portion can be covered up with the signal of a fixed amplitude inserted at the timing as indicated by the reference symbol B in FIG. 2.

In the case of FIG. 3(b), the uppermost part of the image sensing plane of the image sensor 22 is used for the above stated purpose. However, with a suitable DC bias applied to the vertical scanning signal fVS produced from the vertical scanning signal generating circuit 20, any desired part of the image sensing plane is usable for that purpose.

The arrangement described in the foregoing is also applicable to a case where a camera tube of the kind called the 3-tube type is employed. Further, a moving image can be prevented from blurring to enhance the advantage of a high speed operation by actuating a shutter of the slit type or a flash device in synchronism with the vertical sync signal nfV which is produced for driving the image sensor 22. With the video signal which is produced from the clamp circuit 26 applied to an ordinary TV device, a display can be made including an n number of temporally continuous object's images aligned in the vertical direction of the picture plane of the TV device. Since this output video signal has the same horizontal and vertical sync signals as in the case of a normal photo taking mode, the signal is recordable by an ordinary video tape recorder and also can be displayed by a TV monitor device.

Figure 4:
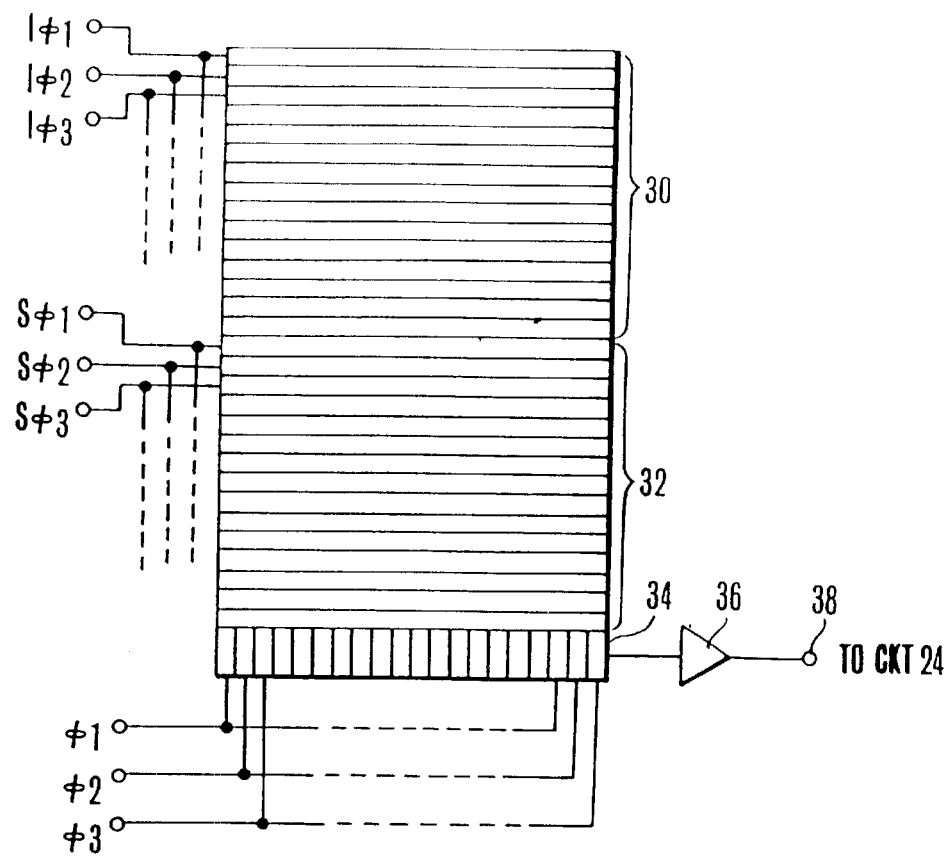
FIG. 4 shows by way of example a modification of the image sensor of the apparatus of FIG. 1.
Figure 5:
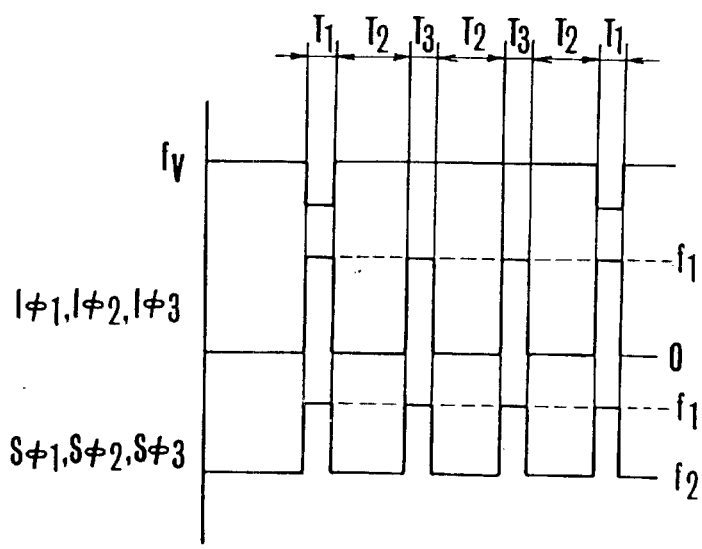
FIG. 5 is a timing chart showing the timing of driving signals applied to the image sensor of FIG. 4.

FIG. 4 shows by way of example a case where the image sensor 22 is a frame transfer type CCD. FIG. 5 shows the timing of a scanning signal (transfer pulses) obtained in the triple high speed photo taking mode. The illustration includes a photo-electric converting part 30; a temporary accumulating part 32; a horizontal transfer part 34 for reading; a buffer amplifier 36; and the output terminal 38 of the image sensor. The photo-electric converting part 30 is provided with control lines I$\phi$1 to I$\phi$3, the temporary accumulating part 32 with control lines S$\phi$1 to S$\phi$3 and the horizontal reading transfer part 34 with control lines $\phi$1 to $\phi$3 respectively for applying transfer pulses to them. Reference symbols f1 and f2 denote the frequency of the transfer pulses and are in a relation of f1>f2. A symbol T1 denotes a period of time corresponding to the vertical sync pulses of a normal TV signal. A symbol T3 denotes a period (the timing indicated by the symbol B in FIG. 2) which corresponds to the vertical sync signal nfV to be applied from the vertical sync signal generating circuit 16 to the vertical scanning signal generating circuit 20 in the triple high speed photo taking mode. A symbol T2 denotes a period corresponding to a signal portion obtained in the triple high speed photo taking mode.

In the normal speed photo taking mode, the transfer pulses of the frequency f1 are applied to the control lines I$\phi$1 to I$\phi$3 and S$\phi$1 to S$\phi$3 during the period of time T1 in synchronism with the vertical sync signal fV. This causes the electric charge accumulated at the photo-electric converting part 30 to be transferred to the temporary accumulating part 32. Following this, the transfer pulses of the frequency f2 are applied to the control lines S$\phi$1 to S$\phi$3 to cause the electric charge signal to be transferred from horizontal lines one by one to the horizontal transfer part 34. Then, the horizontal transfer pulses are applied to the control lines $\phi$1 to $\phi$3 to have the signal of each picture element produced from the horizontal transfer part 34 to the output terminal 38. This operation is repeated in synchronism with the vertical sync signal fV. In the event of the high speed photo taking mode, the transfer pulses of the frequency f1 is applied to the control lines I$\phi$1 to I$\phi$3 and S$\phi$1 to S$\phi$3 not only during the period of time T1 but also during the period of time T3 as shown in FIG. 5. In this instance, if the number of the transfer pulses, i.e. the number of vertical transfer lines, is arranged to be the same as in the case of the normal speed photo taking mode, the electric charge accumulated in a 1/n part of the the photo-electric converting part 30 located on the lower side (upper side as viewed on the drawing) of the converting part 30 would be repeatedly read out in the event of the high speed photo taking mode. However, with the number of transfer pulses increased, any desired vertical position of the photo-electric converting part 30 can be selected.

In the case of this specific embodiment, the horizontal scanning signal generating circuit 18 and the vertical scanning signal generating circuit 20 are arranged to generate the above stated transfer pulses instead of scanning signals of a saw-tooth wave form. Meanwhile, other processing actions and the signal inserting process to be performed during the period of time T3 are performed in the same manner as in the case of FIG. 1. Further, with the vertical transfer arranged to be performed twice during the periods of time T1 and T3, the advantage of an electronic shutter is attainable.

Figure 6:
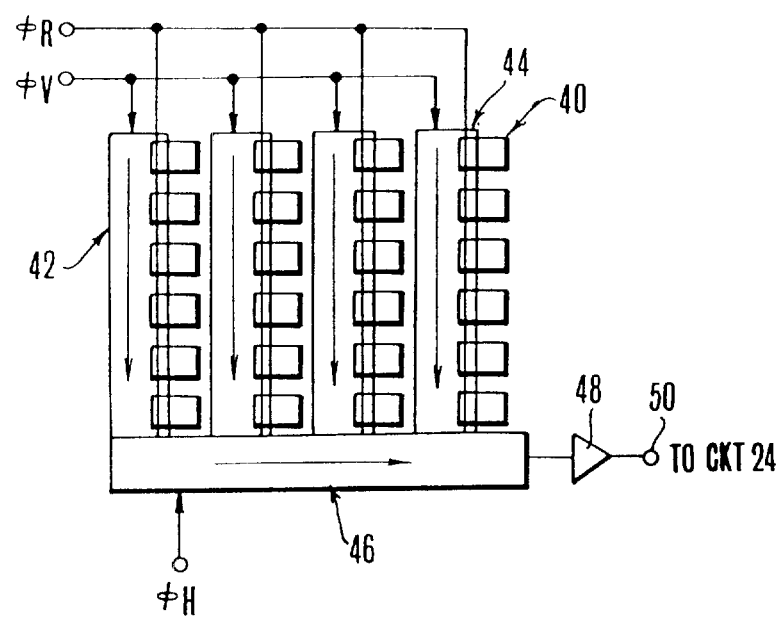
FIG. 6 shows another example of modification of the image sensor of the apparatus of FIG. 1.
Figure 7:
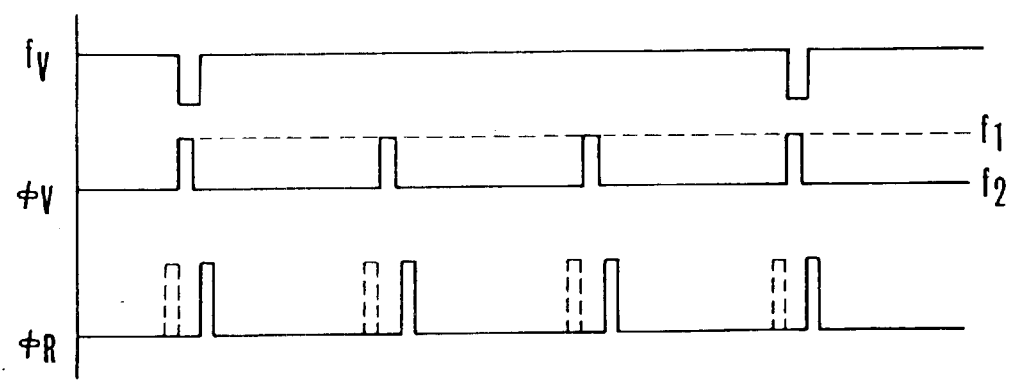
FIG. 7 is a timing chart showing the timing of driving signals applied to the image sensor of FIG. 6.

FIG. 6 shows another case where an inter-line reading type CCD is employed as the image sensor 22. Referring to FIG. 6, many photo-electric converting cells 40 are vertically and horizontally aligned. The image sensor includes vertical transfer CCDs 42; gate electrodes 44; a horizontal transfer CCD 46; a buffer amplifier 48 and an output terminal 50. They are arranged in a known manner. Reference symbols $\phi$R, $\phi$V and $\phi$H denote a gate pulse and vertical and horizontal transfer pulses respectively. FIG. 7 shows the timing of signals obtained in the high speed photo taking mode.

In the normal speed photo taking mode, the gate pulse $\phi$R is applied in synchronism with the vertical sync signal fV. The electric charges of all the cells 40 are simultaneously transferred to the vertical transfer CCDs 42. After that, the electric charges are transferred from horizontal lines, one by one, to the horizontal transfer CCD 46 as the vertical transfer pulse $\phi$V is applied in synchronism with the horizontal sync signal fH. Then, the horizontal transfer pulse OH causes a video signal to be produced at the output terminal 50. In the event of the high speed photo taking mode, the gate pulse OR is applied an n number times (3 times in the case of FIG. 6) during one vertical scanning period as shown in FIG. 7. However, since some portion of the electric charge sent from above remains at the vertical transfer CCD 42, the residual electric charge must be cleared. For this purpose, the vertical transfer pulse $\phi$V of the frequency f1 which is higher than the frequency f2 of the reading action are applied immediately before the gate pulse $\phi$R. For the purpose of an electronic shutter operation, the gate pulse $\phi$R is applied also before the vertical transfer pulse OV of the frequency f1, as indicated by broken lines in FIG. 7. Further, the signal can be read out from any of the cells 40 located in a desired vertical position by applying a suitable number of the vertical transfer pulses $\phi$V after the gate pulse $\phi$R. Other possible methods for arranging the image sensor include, for example: A method in which the gate pulse OR is divided and is applied only to a 1/n line portion; another method in which the vertical transfer pulse XV is divided and is allowed to work for a 1/n line portion; and a further method in which a reset electrode is provided for each of the cells or each of the vertical transfer CCDs 42.

In the case of the embodiment shown in FIG. 6, the signal processing circuit 24 and the clamp circuit 26 are arranged in the same manner as shown in FIG. 1.

The above stated method is also applicable to apparatuses of other kinds using an MOS- or SIT-type image sensor.

As understood from the foregoing description, the image pick-up apparatus which is shown in FIGS. 1 to 7 is capable of performing a high speed photo taking operation with temporal resolution increased by n times without recourse to any complex circuit arrangement. Besides, the video signal obtained by the apparatus can be recorded or displayed by an ordinary video recording apparatus or an ordinary TV device.

Figure 8:
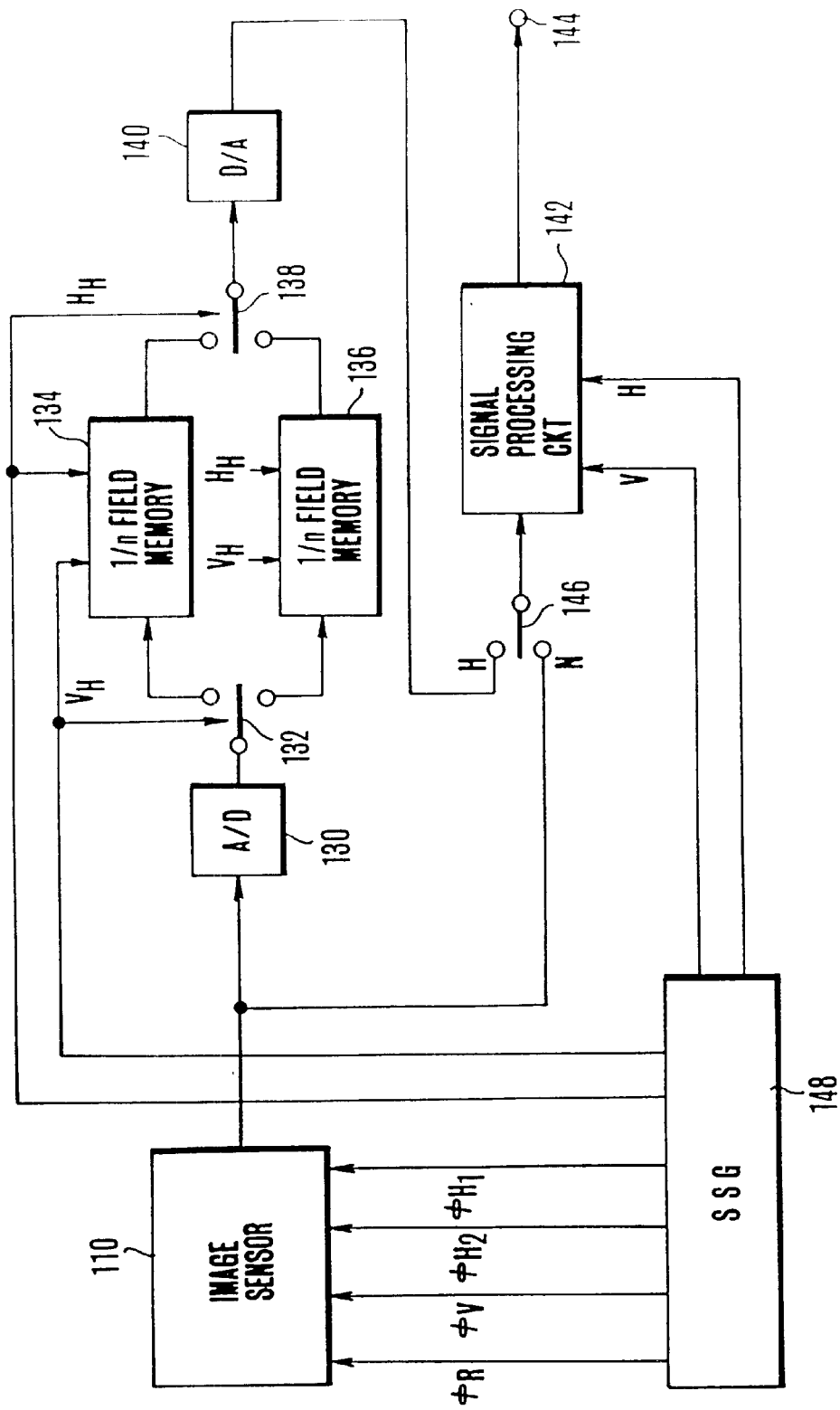
FIG. 8 is a block diagram showing an image pick-up apparatus arranged as another embodiment of this invention.
Figure 9:
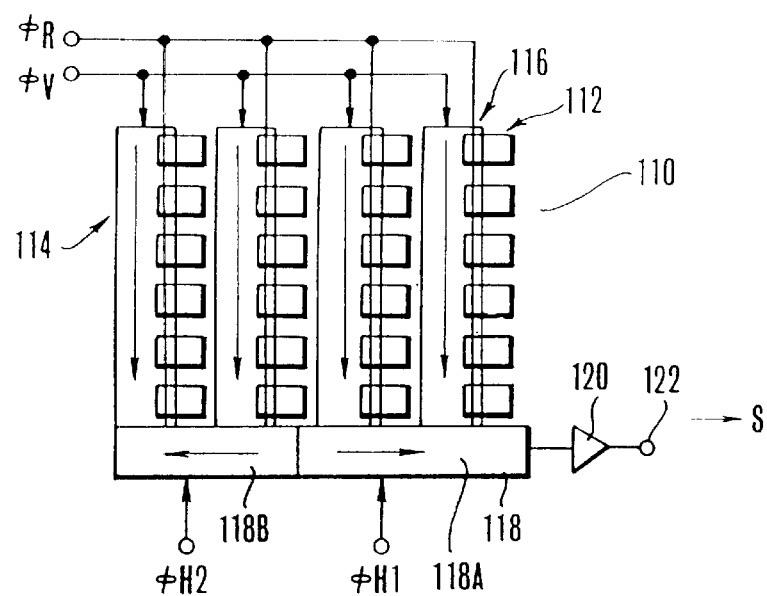
FIG. 9 shows by way of example the image sensor of the apparatus shown in FIG. 8.

FIG. 8 is a block diagram showing in outline the arrangement of an image pick-up apparatus arranged as another embodiment of this invention. FIGS. 9 shows by way of example the arrangement of the image sensing part of the embodiment shown in FIG. 8. Symbols n and m which are used in the following description denote integers.

Figure 10:
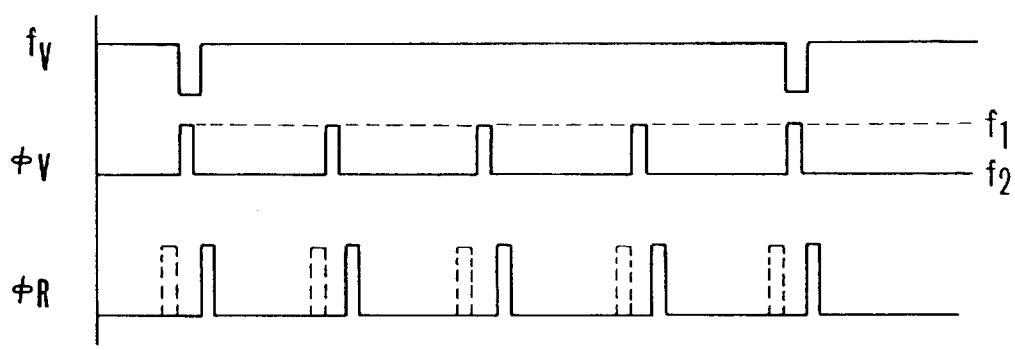
FIG. 10 is a timing chart showing the timing of driving signals applied to the image sensor of FIG. 9.

Before describing the arrangement of FIG. 8, an inter-line type CCD image sensor 110 which is arranged as shown in FIG. 9 is described as follows: Referring to FIG. 9, many photo-electric converting cells 112 are vertically and horizontally aligned. The illustration includes CCDs 114 for vertical transfer; gate electrodes 116; a horizontal transfer CCD 118; a buffer amplifier 120; and an output terminal 122. These parts are arranged in a known manner. In the high speed photo taking mode of this embodiment, however, the horizontal transfer CCD 118 is used by dividing it into two at a 1/m point away from the output terminal 122 (or in the middle part of the CCD 118, because m=2 in the case of FIG. 9.) One of the two is a CCD 118A which is located on the right-hand side while the other is a CCD 118B which is on the left-hand side. The illustration includes a vertical transfer pulse φV to be applied to vertical transfer CCDs 114; a horizontal transfer pulse OH1 to be applied to the horizontal transfer CCD 118A for a rightward shift; a horizontal transfer pulse φH2 to be applied to the horizontal transfer CCD 118B for a leftward shift or for a rightward shift in the case of normal speed photo taking; and a gate pulse φR. FIG. 10 shows the timing of these pulses φV and φR obtained in the high speed photo taking mode in relation to the vertical sync signal fV of a video signal obtained in the normal speed photo taking mode. These pulses φV, φR, φH1 and φH2 are obtained from a sync signal generating circuit (SSG) 148.

In the normal speed photo taking mode, the gate pulse φR is applied within a vertical retrace line period in synchronism with the vertical sync signal fV. In response to this, the electric charges of all the cells 112 are simultaneously transferred to the vertical transfer CCDs 114. After that, when the vertical transfer pulse φV is applied in synchronism with the horizontal sync signal fH, the electric charges are transferred to the horizontal transfer CCD 118 from horizontal lines, one after another. The horizontal transfer CCD 118 then completely transfers it to the right in response to the horizontal transfer pulses φH1 and φH2. As a result, a video signal S is supplied to the output terminal 122.

In the high speed photo taking mode, the image sensor operates as described below on the assumption that the photo taking speed of this mode is four times (n=4) as high as that of the normal speed photo taking mode: In this case, the frequency of the vertical scanning signal to be applied to the image sensor 110 is increased to a value which is four times as high as the normal frequency thereof. In other words, referring to FIG. 10, four gate pulses φR are applied during one vertical scanning period of the normal speed photo taking mode. The electric charges are transferred from the cells 112 to the vertical transfer CCDs 114 by the gate pulse φR. Then, the electric charges in the CCDs 114 are transferred by the vertical transfer pulse φV (of the frequency f2) to the horizontal transfer CCD 118 from the horizontal lines one by one. In this instance, the frequency of the vertical transfer pulse φV is two times (=n/m) as high as that of the vertical transfer pulse obtained in the normal speed photo taking mode. Then, a 1/2 horizontal line portion of the signal is sent out from the horizontal transfer CCD 118A by the horizontal transfer pulse φH1 toward the output terminal 122 while another 1/2 horizontal line portion of the signal is sent out from the other horizontal transfer CCD 118B by the horizontal transfer pulse φH2 in the opposite direction and is discarded. At a point of time when about 1/2 of the vertical scanning lines is read out, a high speed vertical transfer pulse φV which is of a frequency f1 (higher than a frequency f2) is applied to clear the electric charge remaining within the vertical transfer CCDs 114. This clearing process may be accomplished by changing the direction of the transfer by the horizontal transfer pulse φH1 to the left from the right as viewed on FIG. 9. In another possible method for making this clearance, the signal produced from the output terminal 122 is removed by means of some gate which is not shown and, after completion of the clearing process, the gate pulse φR is again applied to have the electric charge read out from the cells 112.

A video signal obtained from the output terminal 122 of the image sensor 110 in the high speed photo taking mode includes a vertical sync signal VH which is of a frequency four times as high as that of the ordinary TV signal and a horizontal sync signal HH which is of a frequency two times as high as that of the ordinary TV signal. With respect to the output image plane, the video signal has a resolving power which is 1/2 of that of a resolving power obtainable at the normal photo taking speed in the horizontal direction and 1/4 of the latter in the vertical direction and thus gives a smaller image plane. Referring to FIG. 11(a), reference symbols A, B, C and D denote such small image planes. The small image planes A, B, C and D are temporally continuous. The high speed video signal obtained in this manner is converted by the circuit arrangement shown in FIG. 8 into a video signal which includes horizontal and vertical sync signals of the same frequencies as the horizontal and vertical sync signals obtained by the ordinary photo taking speed and gives an image allocation as shown in FIG. 11(b).

Referring to FIG. 8, the image pick-up apparatus is arranged as follows: When the image sensor 110 is in the normal photo taking mode, the connecting position of a switch 146 is on one side N thereof. The video signal produced from the output terminal 122 of the image sensor 110 is supplied to the signal processing circuit 142 via the N side terminal of the switch 146. In the event of the high speed photo taking mode, the video signal produced from the output terminal 122 is first converted into a digital signal by an A/D converter 130. The connecting position of a switch 132 is arranged to be changed from one position over to another by a signal VH which is generated by an SSG 148 and indicates the vertical scanning period obtained in the high speed photo taking mode. The output signal of the A/D converter 130 is serially applied for every vertical scanning period of the high speed photo taking mode to an m number (2 in this case) of memories 134 and 136 each of which has a capacity for 1/n field. The memories 134 and 136 may be either of the random access type or of the first-in first-out type. In reading the signal from the memories 134 and 136, the outputs of the memories 134 and 136 are alternately read out by changing the position of a switch 138 from one side over to another by means of the signal HH produced from the SSG 148 indicating the horizontal scanning period of the high speed photo taking mode. The signal thus read out is applied to a D/A converter 140. Then, the analog output of the D/A converter 140 is supplied to the signal processing circuit 142 via the switch 146 the position of which has been shifted to the other side H thereof. At the circuit 142, the sync signal of an ordinary TV signal is added and a signal processing operation known in the field of video cameras is carried out. Since the embodiment is arranged to perform the signal processing operation after D/A conversion, the chrominance signal processing action, etc. can be carried out by using the same video signal processing arrangement that is used in the ordinary speed photo taking mode. It goes without saying that the signal may be subjected to the signal processing operation in the digital state as necessary.

The video signal which is obtained in this manner gives 2×2 small image planes within one image plane as shown in FIG. 11(b). The output signal of the signal processing circuit 142 is produced from a terminal 144. Since the signal thus obtained has the vertical and horizontal sync signals which are of the same frequencies as those of a normal TV signal, the output signal can be either displayed by an ordinary monitor device or recorded by an ordinary VTR or the like.

Figure 12:
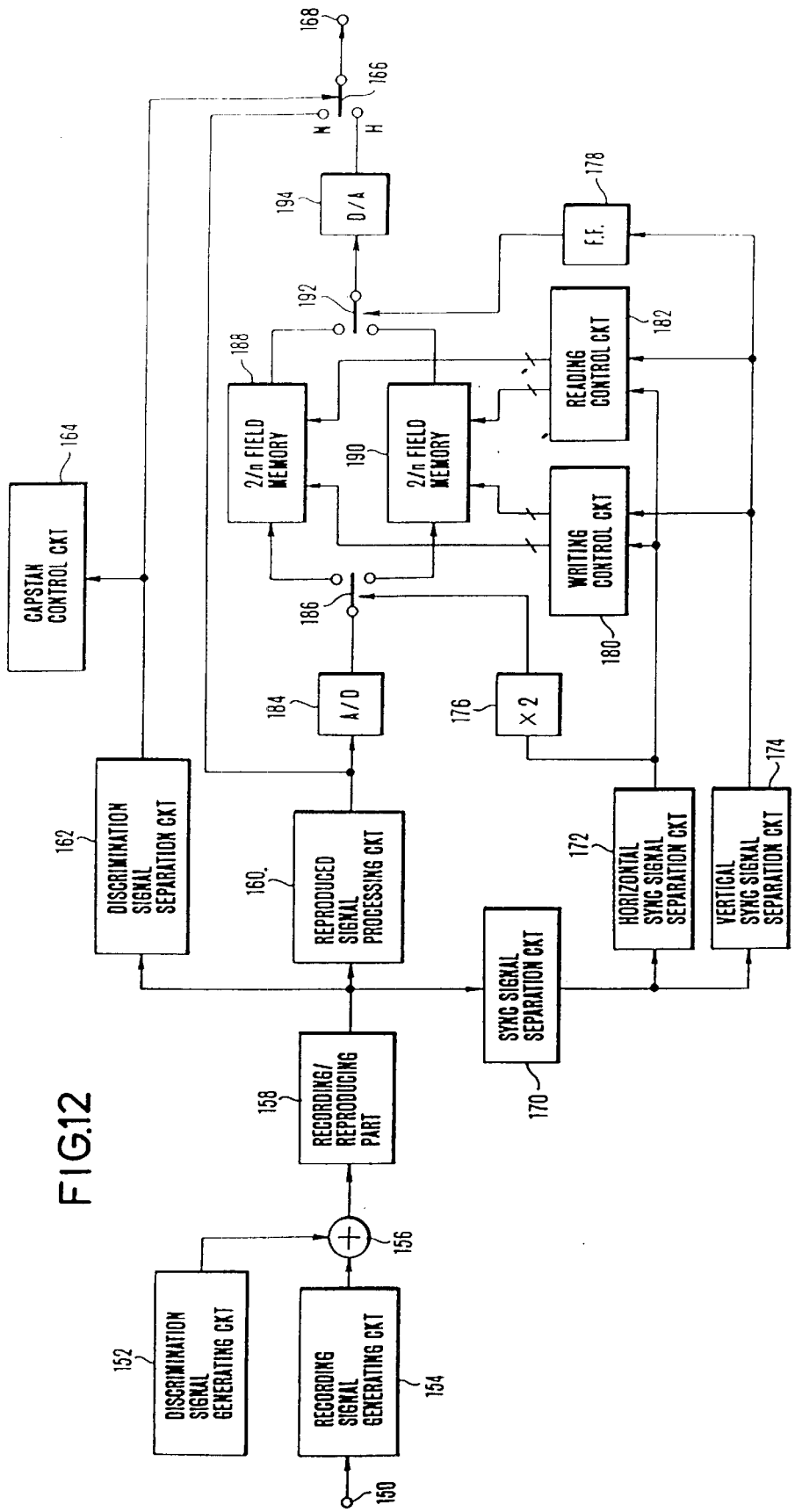
FIG. 12 is a diagram showing the arrangement of a recording and/or reproducing apparatus which corresponds to the image pick-up apparatus and is arranged according to this invention.

FIG. 12 shows by way of example a recording and reproducing apparatus which is arranged according to this invention to record or reproduce the video signal produced from the image pick-up apparatus shown in FIG. 8. In this case, the invention is applied to a VTR of the conventional two-head helical scanning type.

The video signal which is produced either in the normal speed photo taking mode or in the high speed photo taking mode is obtained via an input terminal 150 connected to the output terminal 144 of the image pick-up apparatus. The video signal is supplied to a recording signal processing circuit 154. The circuit 154 frequency modulates the luminance signal of the incoming video signal in the known manner. The carrier chrominance signal of the signal is frequency converted to the lower band thereof. The video signal processed by the circuit 154 is supplied to an adder 156 to have a discrimination signal multiplexed therewith for a discrimination between the normal photo taking mode and the high speed photo taking mode. A discrimination signal generating circuit 152 is arranged to generate the above stated discrimination signal in response to an instruction given either by a manual operation or from the image pick-up apparatus. Further, the discrimination signal is either superimposed on the video signal in the form of a pilot signal or superimposed on the video signal as a pulse signal during the vertical retrace line period. The video signal with this discrimination signal multiplexed therewith is supplied to a recording/reproducing part 158. The signal is then serially recorded on a magnetic tape which is travelling at a given speed by means of a known pair of rotary heads having different azimuth angles.

In reproducing the recorded video signal by the above stated recording/reproducing part 158, the embodiment operates as described below, on the assumption that the recorded video signal has been obtained in the normal speed photo taking mode: In accordance with the discrimination signal which is separated by a discrimination signal separation circuit 162, the position of a switch 166 is, in this instance, shifted to one side N thereof. At a reproduced signal processing circuit 160, the luminance signal of the video signal which has undergone the known signal processing operation is frequency demodulated and the carrier chrominance signal is brought back to its original frequency band. The video signal thus processed by the circuit 160 is supplied to a terminal 168 via a switch terminal on the side N of a switch 166 to be supplied to a monitor or the like. In this instance, a capstan control circuit 164 controls the rotation of a capstan which is not shown in such a way as to have the magnetic tape travel at the same speed as the recording speed indicated by the discrimination signal. This operation is performed in exactly the same manner as in the conventional VTR.

In the event of reproduction of a video signal which is obtained in the high speed photo taking mode, the embodiment operates as follows: In this instance, the video signal processed by the reproduced signal processing circuit 160 includes four small image planes A, B, C and D within one field as shown in FIG. 11(b). In the case of the apparatus illustrated, the video signal is converted into a signal having one of the four small image planes included in one field one after another so that these small image planes can be serially displayed one at a time, in a position A as shown in FIG. 11(c). In other words, during a period corresponding to four fields of the reproduced video signal, one field portion (having four small image planes) of the reproduced signal is obtained and the reproduced signal is thus produced as a video signal for four fields, instead of one.

Figure 13:
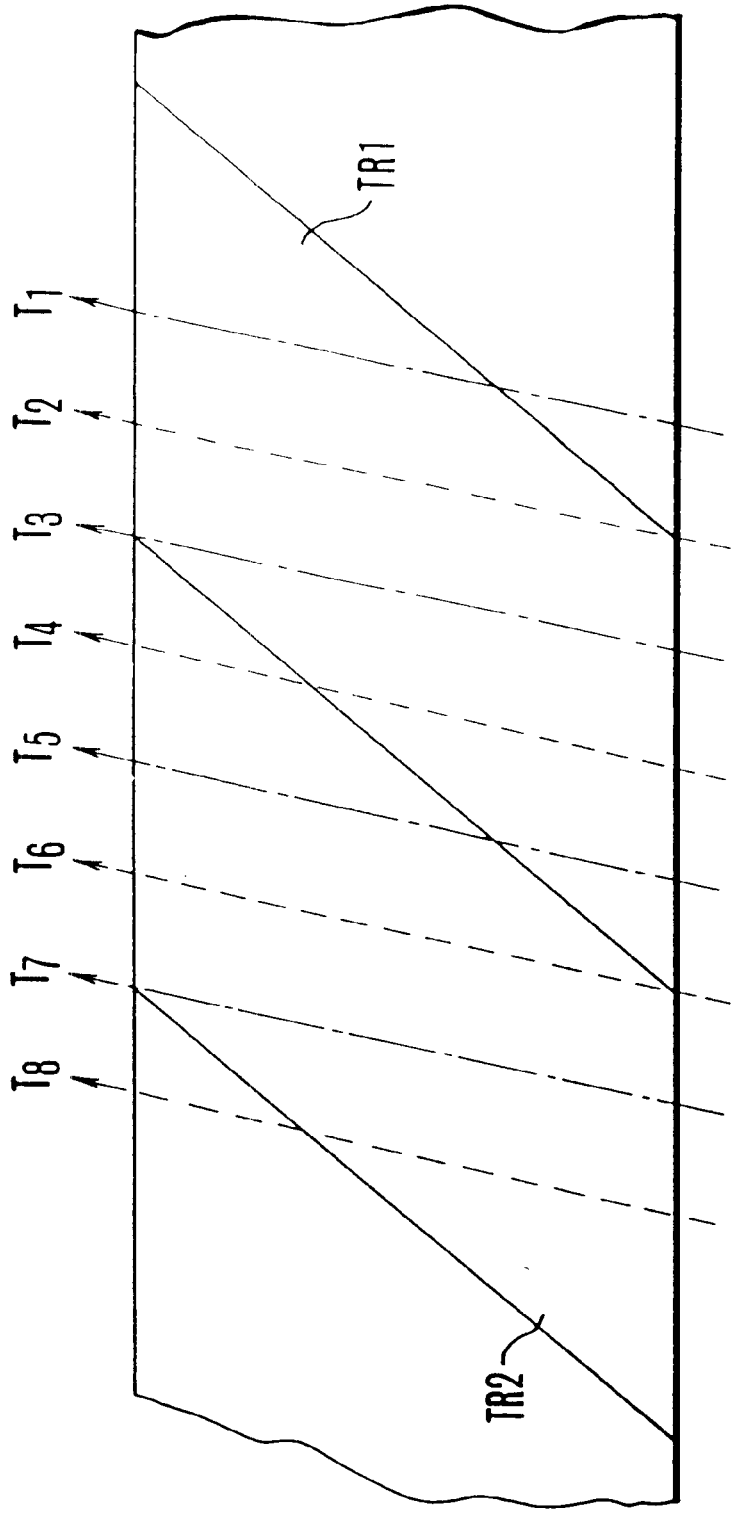
FIG. 13 shows magnetic tape tracing loci of the apparatus of FIG. 12.

The discrimination signal which is separated by the separation circuit 162 shifts the position of the switch 166 to the other side H thereof and causes the capstan control circuit 164 to have the magnetic tape travel at a speed which is 1/4 of the recording speed. The tracing state of the rotary heads which is then obtained over the magnetic tape is as shown in FIG. 13. In FIG. 13, full lines indicate boundaries between tracks. A reference symbol TR1 denotes a track of plus azimuth and a symbol TR2 a track of minus azimuth. One-dot chain lines T1, T3, T5 and T7 indicate center lines of the tracing loci of the head of plus azimuth. Broken lines T2, T4, T6 and T8 indicate the center lines of the tracing loci of the head of minus azimuth.

The video signal processed by the reproduced signal processing circuit 160 is supplied to an A/D converter 184 to be digitized there. The digitized signal thus obtained is supplied to a switch 186. The switch 186 then changes the frequency of the horizontal sync signal over to a signal which is obtained by stepping up the frequency of the horizontal sync signal included in the reproduced signal by two times at a step-up device 176 which is composed of a PLL, etc. As a result of that, the first half portion of the signal of each horizontal scanning line is supplied to a 2/n field memory and the latter half to another 2/n field memory 190. Further, the above stated horizontal sync signal is separated by a horizontal sync signal separation circuit 172 from a composite sync signal separated by a sync signal separation circuit 170.

Figure 14:
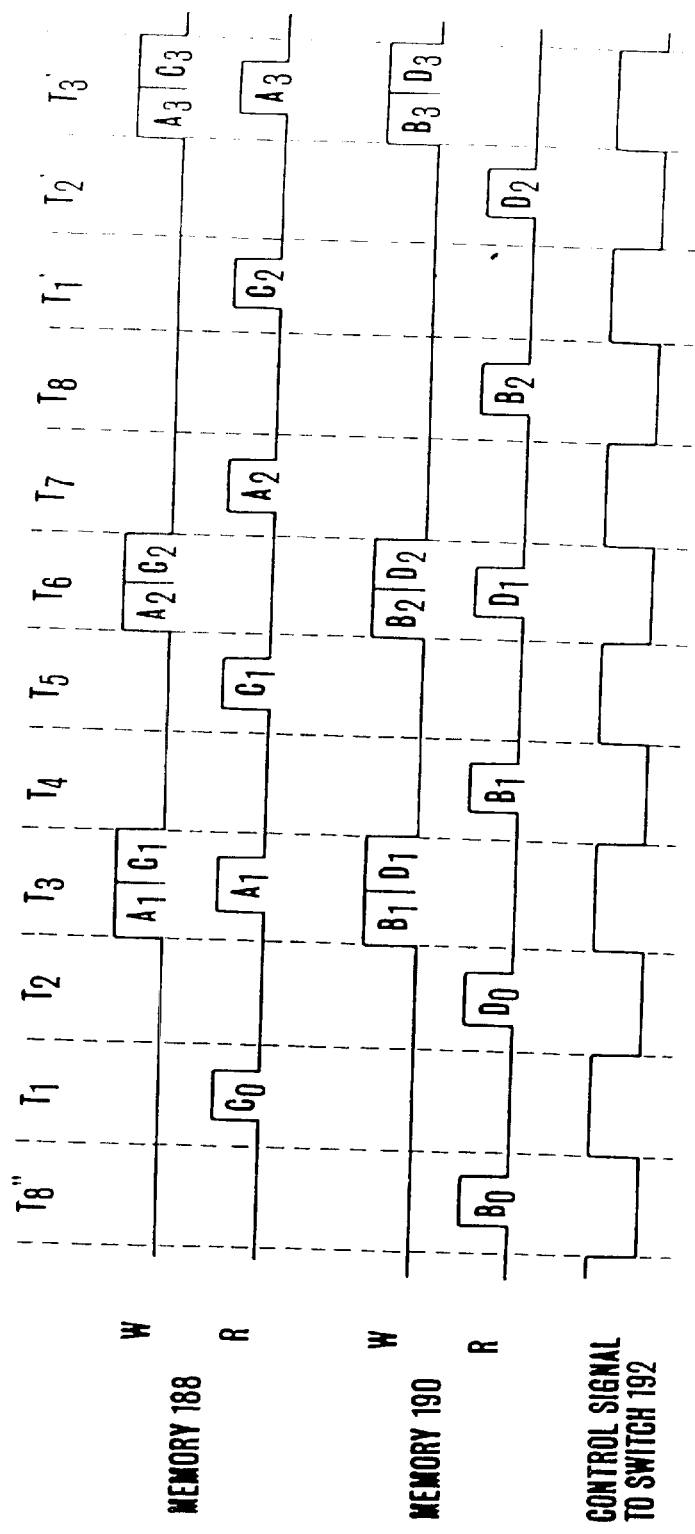
FIG. 14 is a chart showing the timing of writing and reading into and from the memory of the apparatus of FIG. 12.

A writing control circuit 180 is provided for the memories 188 and 190 to control the timing of writing into the memories and the writing addresses of them. A reading control circuit 182 is arranged to control the timing of reading from these memories 188 and 190 and the reading addresses of them. FIG. 14 is a chart showing the timing of writing (W) and reading (R) actions performed on the memories 188 and 190. Referring to FIG. 14, a period from a time T1 to a time T8 corresponds to a period of time during which the reproduced signal is obtained by the tracing process represented by the tracing loci T1 to T8.

The video signal is written in the memories 188 and 190 during the periods of time T3 and T6. The video signal portions corresponding to the small image planes A and B are written in during the first half of each of the writing periods and signal portions corresponding to the small image planes C and D during the latter half of each of the writing periods. Further, by virtue of the switching operation of the above stated switch 186, the video signal portions corresponding to the small image planes A and C are written in the memory 188 while the signal portions corresponding to the small image planes B and D are written in the other memory 190. In FIG. 14, reference symbols A1, B1, C1 and D1 denotes the video signal portions recorded in a track TR1 and symbols A2, B2, C2 and D2 the video signal portions recorded in a track TR2. These video signal portions respectively correspond to the small image planes A, B, C and D which are shown in FIG. 11(b). Further, the relation of the track to the tracing locus becomes the same as the relation obtained at the tracing locus T1 after completion of the tracing of the tracing locus T8. In FIG. 14, the periods of time corresponding to these tracing loci (after the locus T8) are indicated by apostrophized symbols T1', T2', - - - -. In this instance, the above stated writing action is performed during the period T3' and T6'.

The video signal portions written in the memories 188 and 190 during the period of time T3 are read out in the sequence of the small image planes A1, B1, C1 and D1 during the periods T3, T4, T5 and T6 respectively. The timing for this reading process is arranged to be 1/2 field period in the middle of each one field period and also to be 1/2 period in the middle of each horizontal scanning period. The outputs of these memories 188 and 190 are alternately produced for every field period via a switch 192 to be supplied to a D/A converter 194. The writing control circuit 180 and the reading control circuit 182 operate according to the above stated reproduced horizontal sync signal and the reproduced vertical sync signal which is separated from the composite sync signal by the vertical sync signal separation circuit 174 respectively. The switch 192 is under the control of a control signal shown in FIG. 14 which is obtained by supplying the reproduced vertical sync signal to a flip-flop 178.

The video signal produced from the D/A converter 194 is displayed in the form of small image planes A, B, C and D which serially appear in the middle part of an output picture plane as shown in FIG. 11(c). Therefore, a slow motion image having information density four times as high as the density obtainable by the normal speed photo taking mode can be obtained in the time base direction. This output of the D/A converter 194 is produced via one side H of a switch 166 and an output terminal 168.

While two 2/n field memories are provided in the case of the circuit arrangement of FIG. 12, they may be replaced with only one memory if it is a random access memory. Further, it goes without saying that the conversion can be accomplished also by controlling addresses with the memory arranged to have a capacity for one field.

A background part G shown in FIG. 11(c) may be used for displaying various data such as time, a field number, etc. Although the display becomes coarser, the image may be displayed in an enlarged state. If the values n and m are selected to satisfy a relation of $n=m^2$, the aspect ratio of each image becomes the same as that of the image obtained by the normal photo taking mode.

An electronic shutter function can be imparted to the apparatus by an arrangement to apply the gate pulse φR (indicated by broken lines in FIG. 10) prior to the vertical transfer pulse φV of the frequency fl. It is of course possible to use a mechanical shutter or an electronic shutter of some different kind or to use the shutter in combination with a flash device or the like.

In the case of the embodiment described, the values n and m are set at 4 and 2. However they can be set at any values so far as the n is a multiple of the m. Further, the image sensor 110 may be a frame transfer type CCD or may be of the MOS type.

While the upper left part of the image sensing plane (the cell located at a lower right part of the image sensor 110 as shown in FIG. 9) is arranged to be read out in the case of the embodiment described, the reading part may be changed as desired to the middle or some other part of the image plane by adjusting the transfer signal to be applied to the image sensor 110.

It will be understood from the foregoing description that the system shown in FIGS. 8 to 14 is capable of forming, with a very simple circuit arrangement, a high speed video signal which can be recorded or displayed by means of an ordinary video recording device or an ordinary TV device without necessitating any additional arrangement. The invented system also permits a change in the photo taking speed and a combined use of the ordinary photo taking speed. It is another advantageous feature of the system that the system permits a slow motion reproduction of images picked up at a high speed.

Figure 15:
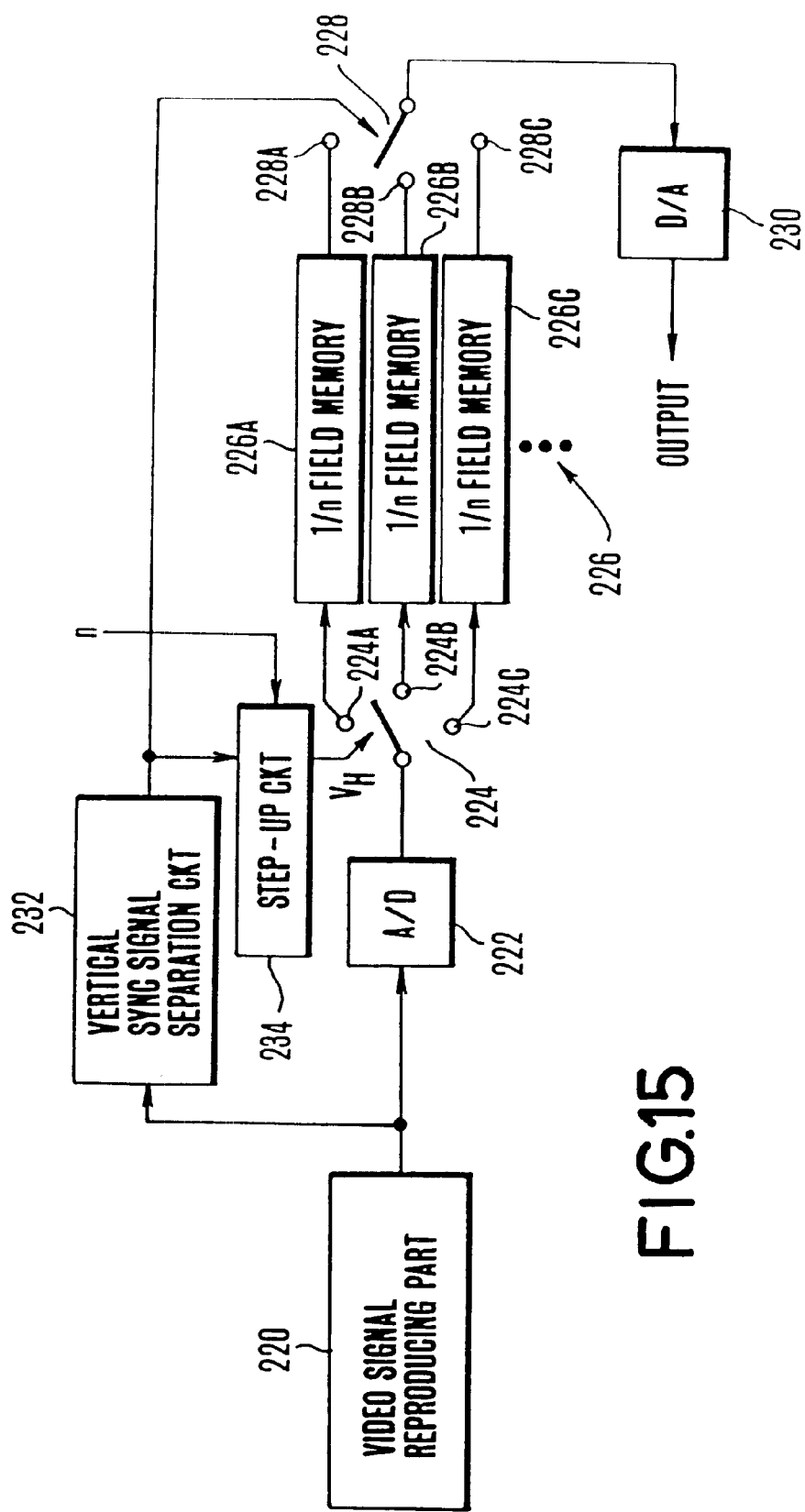
FIG. 15 is a diagram showing a reproducing apparatus arranged according to this invention.

FIG. 15 shows a reproducing apparatus arranged according to this invention to be capable of performing a slow motion reproduction of a video signal obtained from the image pick-up apparatus of FIG. 1 and recorded on a recording medium by the conventional VTR. FIGS. 16(a) and 16(b) are front views showing examples of arrangement of rotary heads employed as reproducing heads in a video signal reproducing part 220 shown in FIG. 15.

FIG. 16(a) shows a fundamental head arrangement of a known two-head helical scanning type VTR which performs azimuth recording. FIG. 16(b) shows a head arrangement wherein two pairs of heads are employed with each pair of heads arranged to have different azimuth angles. These illustrations include a rotary drum 210 and the heads 212, 212A, 212B, 214, 214A and 214B.

Referring to FIG. 15, the video signal reproducing part 220 is arranged to receive signals reproduced by the heads of FIG. 16(a) or 16(b) and produce a video signal after performing a known signal processing operation on the incoming signals; and a reference numeral 222 denotes an A/D converter. The digital signal output of the A/D converter 222 is supplied via a switch 224 to a memory 226 including memories 226A, 226B and 226C each having a capacity for 1/n field (n=3 in this instance). The switch 224 is arranged to select contacts 224A, 224B, 224C and 224D one after another in accordance with a vertical sync signal VH which is obtained in a high speed photo taking mode and has, in this case, a frequency three times as high as the frequency of a vertical sync signal obtained in the ordinary speed photo taking mode. The switch 224 thus supplies the small image portions of the video signal separately to the memories 226A, 226B and 226C. The vertical sync signal VH is obtainable by separating the vertical sync signal included in the reproduced signal at a vertical sync signal separation circuit 232 and by stepping it up "n" times at a step-up circuit 234 with information on the photo taking speed given to the system. The value of the "n" can be found by recording information on the photo taking speed n along with the video signal obtained at the high photo taking speed when the signal is recorded on the recording medium and by reproducing the photo taking speed information along with the video signal.

The memories 226A, 226B and 226C may be obtained, for example, either by dividing a random access type image memory having a capacity for one field or by employing a first-in first-out type memory of the same capacity.

The connecting position of a switch 228 is changed from one contact point over to another among contacts 228A, 228B and 228C by means of a standard vertical sync signal V. The switch 228 is thus arranged to supply a signal read out from each of the memories 226A, 226B and 226C to a D/A converter 230. An analog signal produced from the D/A converter 230 is applied to a known TV monitor device or the like.

Figure 18A:
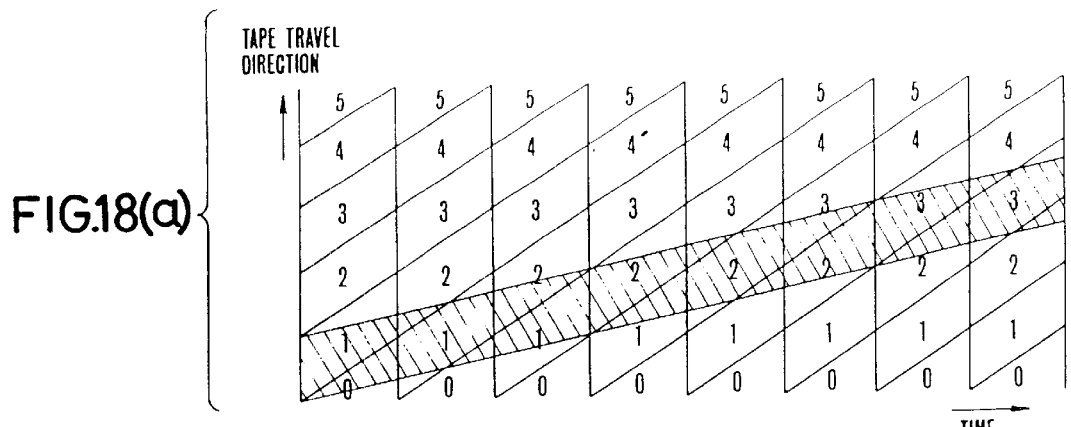
FIGS. 18(a), 18(b), 18(c) and 19(a) and 19(b) show the operation of the reproducing apparatus shown in FIG. 15.
Figure 18B:
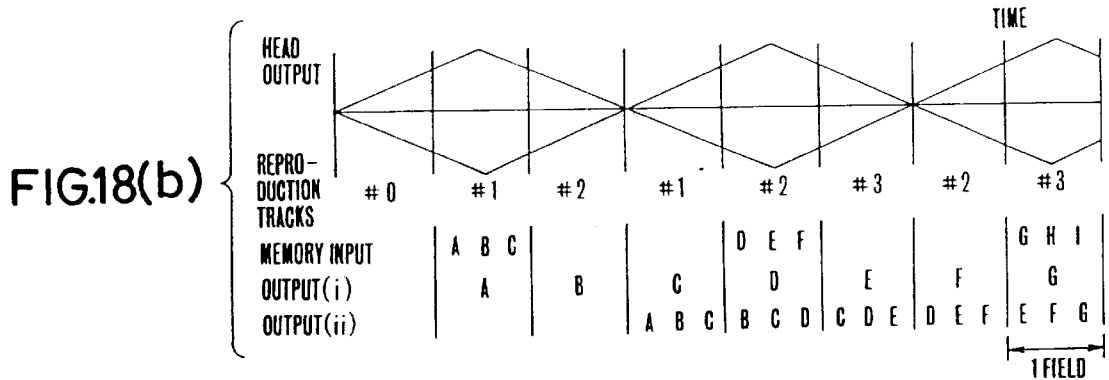

With the tape allowed to travel at a speed which is 1/3 of the recording speed while the heads are arranged in the manner as shown in FIG. 16(a), the heads 212 and 214 trace the recording tracks of a magnetic tape in a manner as shown in FIG. 18(a). As a result, the output of the heads is obtained as shown in FIG. 18(b). In the case of FIG. 18(a), the width of each of the heads 212 and 214 is assumed to be the same as that of each track. A larger head output is of course obtainable, as well known, by increasing the width of the heads 212 and 214 to a value about 1.5 times as large as the track width. Further, in case that the recording tracks are provided with guard bands, the head output becomes smaller. However, that is simply a matter of amplitude.

As understood from FIG. 18(b), the head output is obtained in an acceptable state only once for every three fields. In other words, assuming that the head 212 is arranged to reproduce the record from odd-number tracks and the head 214 to reproduce the record from even-number tracks, the video signal portions bearing the small images A, B and C are respectively written into the memories 226A, 226B and 226C via the switch 224 while the head 212 is reproducing the record from a track #1. Then, when the position of the switch 228 located on the output side of the memory 226 is changed from one contact over to another by the vertical sync signal V, the video signal portions continuously bearing the small images are serially supplied to the D/A converter 230 for every field in a manner as shown at a part "output (i)" in FIG. 18(b). As a result, images are displayed on the TV monitor device in a manner as shown in FIG. 17(c). Further, when the change-over of the position of the switch 228 is effected by the vertical sync signal VH for high speed photo taking to control the sequence of the memories to be connected by the standard vertical sync signal V, the video signal is supplied to the D/A converter 230 in a state as shown at a part "output (ii)" in FIG. 18(b). Then, the TV monitor makes a display in a manner as shown in FIG. 17(b).

Further, in obtaining the signal as shown at the part "output (i)" in FIG. 18(b), the memory 226 can be allowed to have a minimum capacity for 2/3 field. For obtaining the signal as shown at the part "output (ii)" in FIG. 18(b), the memory 226 must be arranged to have a capacity at least for one field.

Figure 18C:
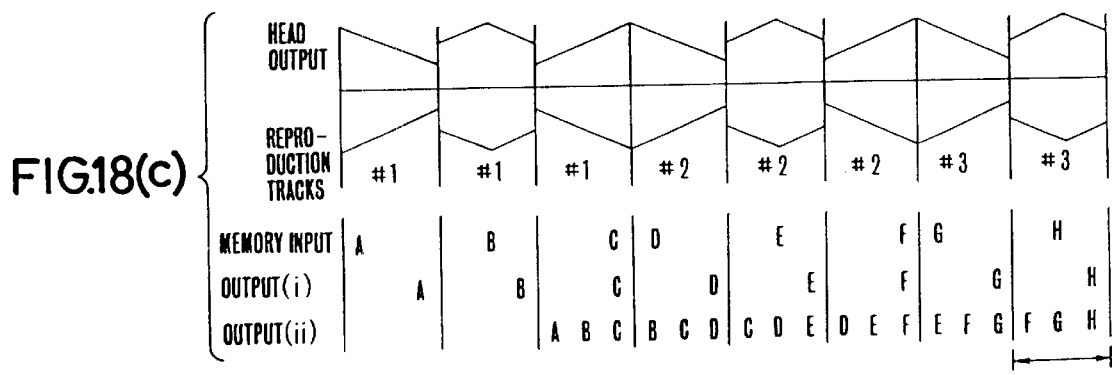

FIG. 18(c) shows by way of example a signal obtained with the heads arranged as shown in FIG. 16(b). This head arrangement always gives a large head output. Therefore, for obtaining the video signal as shown at a part "output (i)" or the image of FIG. 17(c), it is sufficient to arrange the memory 226 to include only one 1/n field memory. In order to obtain the output in a state as shown at a part "output (ii)" for obtaining the reproduced image in a state as shown in FIG. 17(b), the memory 226 must be arranged to have a capacity for one field. However, since a large head output is always obtainable, the input control logic becomes simpler than the head arrangement of FIG. 16(b). This advantage becomes salient in case that the value n is more than 4.

Figure 19A:
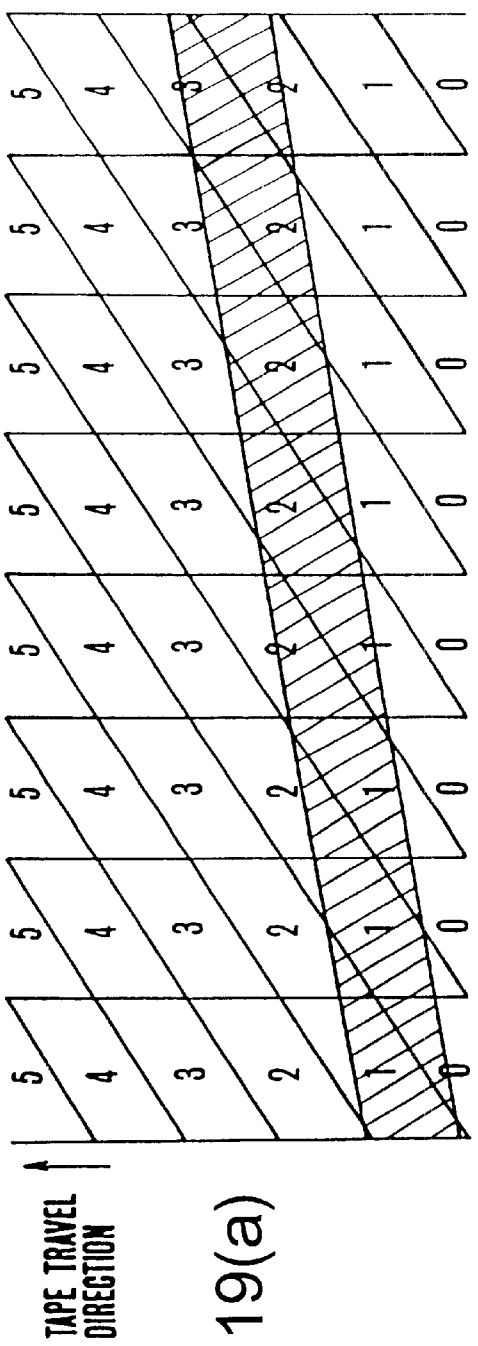
Figure 19B:
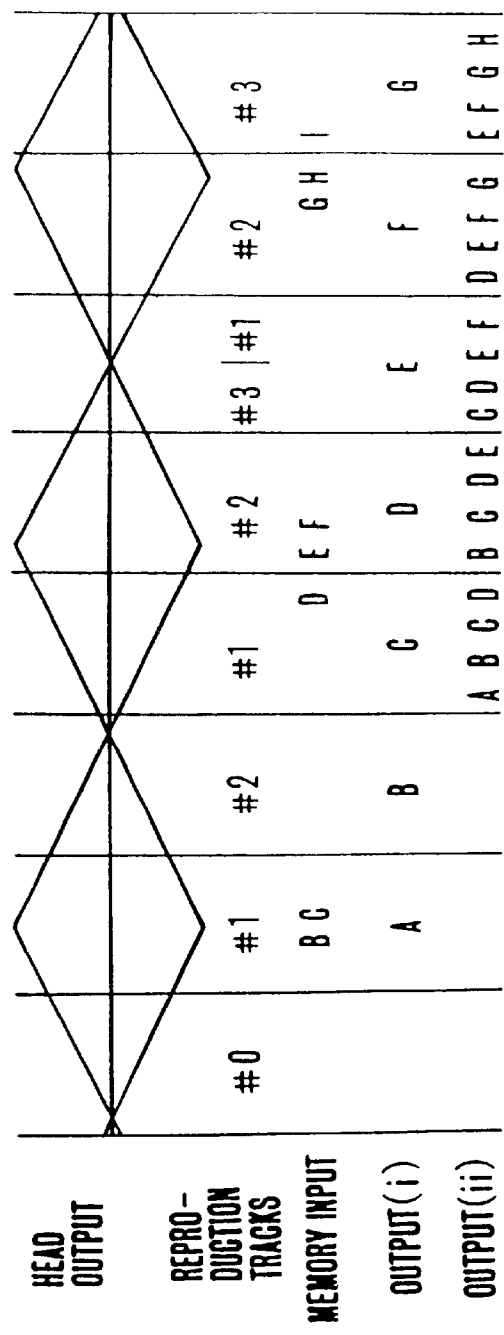

While the reproducing apparatus described in the foregoing is on the assumption of n=3, in the case of n=4 where a reproducing operation is to be performed by allowing the magnetic tape to travel at a speed 1/4 of the recording speed, a point at which the head output becomes zero appears not only at a field change-over point but also at a part other than the field change-over point. In order to obtain the reproduced images in a state as shown in FIG. 17(b), therefore, some control is necessary for the operation of the switch 224 located on the input side of the memory. FIGS. 19(a) and 19(b) show the state of reproduction obtained in the case of n=4. In this case, the head output bears four small images within one field. As shown at a part "memory input" of FIG. 19(b), the signal portions of the small images are arranged to be written into the applicable parts of the memory 226 near the peaks of the head output. This arrangement enables the memory 226 to store therein signal portions having no noise bar for the small images. Therefore, the video signal output can be obtained in a state as shown at a part "output (i)" for a display on the TV monitor device as shown in FIG. 17(c) or in a state as shown at a part "output (ii)" for a display as shown in FIG. 17(b).

Even in case that the value n is 5 or more, the above stated arrangement to have the memory 226 store a signal portion obtained near the peak of the head output makes it possible to reproduce the images in a manner as shown in FIG. 17(b) or 17(c). Further, in cases where reproduction is to be performed at various speeds other than a speed 1/3 of the recording speed, such as a still picture speed, a 1/15 speed, a 1/2 speed, etc., the memory can be likewise arranged to store signal,obtained near the peak of the head output.

In the case of FIG. 16(b), two pairs of heads are arranged to have each pair of heads of different azimuth angles located close to each other. However, this arrangement may be changed to differently allocate the two pairs away from each other, for example, at a spacing degree of 90 degrees or 60 degrees.

While this invention is applied to a two-head helical scanning type VTR in the case of the embodiment described, the invention is of course applicable also to video signal reproducing apparatuses of other kinds.

As readily understood from the foregoing description, the reproducing apparatus is capable of serially reproducing, in the same positions, the small images which have been obtained at a high photo taking speed. Further, since this advantage is attainable without impairing the ordinary reproducing capability and with a slight, inexpensive circuit addition to an ordinary reproducing apparatus adapted for video signals recorded at the normal photo taking speed, the embodiment has a very high degree of utility.

What is claimed is:

1. A video signal reproducing apparatus, comprising:
   a reproducing head for reproducing signals from a recording medium on which first and second video signals can be recorded and a discriminating signal is recorded,
   the first video signal, corresponding to one image composed of a plurality of separated images, recorded on said recording medium in one vertical scanning period thereof, the second video signal corresponding to a single image in one vertical scanning period thereof, the vertical scanning period being defined as a period between adjacent vertical synchronizing signals, the discriminating signal indicating whether the first video signal or the second video signal is recorded; and
   an image processing circuit responsive to the discriminating signal reproduced by said reproducing head, said image processing circuit including a memory capable of storing the vertical scanning period of a video signal reproduced by said reproducing head, said image processing circuit outputting a processed video signal which time-sequentially includes the plurality of separated images in a plurality of vertical scanning periods, respectively, when the first video signal is recorded, and said image processing circuit outputting the second video signal when the second video signal is recorded.

2. An apparatus according to claim 1, wherein said image processing circuit writes only one of the plurality of vertical scanning periods of the first video signal continuously reproduced by said reproducing head.

3. An apparatus according to claim 1, wherein the processed video signal has the plurality of images at the same portion in each of the plurality of vertical scanning periods.

4. An apparatus according to claim 3, wherein the processed video signal has the plurality of images so that each of the plurality of images are to be located at the central position in a screen.

5. An apparatus according to claim 1, further comprising transporting means for transporting the recording medium, said transporting means transporting the recording medium at a first speed when the first video signal is being reproduced by said reproducing head and said transporting means transporting the recording medium at a second speed lower than the first speed when the second video signal is reproduced.

6. An apparatus according to claim 5, wherein the second speed corresponds to a speed at which said transporting means transports when the first or second video signal is recorded on the recording medium.

7. A video signal reproducing apparatus, comprising:

a reproducing head for reproducing signals from a recording medium on which a video signal is recorded, the video signal, representing one image composed of a plurality of separated images recorded in one vertical scanning period thereof, the vertical scanning period being defined as a period between adjacent vertical synchronizing signals; and an image processing circuit which includes a memory capable of storing one vertical scanning period of the video signal reproduced by said reproducing head, said image processing circuit outputting a processed video signal which time-sequentially includes the plurality of separated images in a plurality of vertical scanning periods, respectively.

8. An apparatus according to claim 1, wherein said image processing circuit writes only one of the plurality of vertical scanning periods of the video signal continuously reproduced by said reproducing head.

9. An apparatus according to claim 7, wherein the processed video signal has the plurality of images at the same portion in each of the plurality of vertical scanning periods.

10. An apparatus according to claim 9, wherein the processed video signal has the plurality of images so that each of the plurality of images are to be located at the central position in a screen.

* * * * *

UNITED STATES PATENT AND TRADEMARK OFFICE
CERTIFICATE OF CORRECTION

PATENT NO.    : 6,459,849 B1
DATED         : October 1, 2002
INVENTOR(S)   : Masahide Hasegawa It is certified that error appears in the above-identified patent and that said Letters Patent is hereby corrected as shown below:

<u>Title page, Item [54] and Column 1, lines 1-4,</u>
Delete in its entirety and insert -- IMAGE PICK-UP APPARATUS FOR PRODUCING VIDEO SIGNAL OF HIGH INFORMATION DENSITY IN TIME BASE DIRECTION --.

<u>Column 3,</u>
Line 24, delete "obtained." and insert -- obtained --.

<u>Column 6,</u>
Lines 15 and 30, delete "OR" and insert -- $\phi R$ --.
Line 24, delete "OV" and insert -- $\phi V$ --.
Line 32, delete "XV" and insert -- $\phi V$ --.

<u>Column 7,</u>
Line 5, delete "OH1" and insert -- $\phi H1$ --.

<u>Column 13,</u>
Line 67, delete "signal,obtained" and insert -- signals obtained --.

<u>Column 16,</u>
Line 1, delete "claim 1" and insert -- claim 7 --.

Signed and Sealed this

Twenty-eighth Day of October, 2003

JAMES E. ROGAN
*Director of the United States Patent and Trademark Office*